United States Patent
Lin et al.

(10) Patent No.: US 10,218,013 B2
(45) Date of Patent: Feb. 26, 2019

(54) FLAT PLATE TYPE SOLID OXIDE FUEL CELL STACK UNIT AND FLAT PLATE TYPE SOLID OXIDE FUEL CELL STACK MODULE

(71) Applicant: Institute of Nuclear Energy Research Atomic Energy Council, Executive Yuan, Taoyuan County (TW)

(72) Inventors: Hung-Hsiang Lin, Taoyuan County (TW); Shih-Wei Cheng, New Taipei (TW); Wen-Hsiu Chung, Taoyuan County (TW); Szu-Han Wu, Taoyuan County (TW); Yung-Neng Cheng, Taoyuan County (TW); Ruey-Yi Lee, Taoyuan County (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 943 days.

(21) Appl. No.: 14/588,483

(22) Filed: Jan. 2, 2015

(65) Prior Publication Data

US 2016/0111738 A1  Apr. 21, 2016

(30) Foreign Application Priority Data

Oct. 17, 2014  (TW) .............................. 103135990 A

(51) Int. Cl.
*H01M 2/02* (2006.01)
*H01M 8/04082* (2016.01)
(Continued)

(52) U.S. Cl.
CPC ....... *H01M 8/04201* (2013.01); *H01M 8/006* (2013.01); *H01M 8/0263* (2013.01); *H01M 8/0271* (2013.01); *H01M 8/0273* (2013.01); *H01M 8/1246* (2013.01); *H01M 8/24* (2013.01); *H01M 8/2432* (2016.02);
(Continued)

(58) Field of Classification Search
CPC ............ H01M 2/02; H01M 2/04; H01M 2/08; H01M 2008/1293; H01M 2300/0071; H01M 8/006; H01M 8/0263; H01M 8/0271; H01M 8/0273; H01M 8/04201;
(Continued)

(56) References Cited

U.S. PATENT DOCUMENTS

| 5,851,689 | A | * | 12/1998 | Chen | ................... | H01M 8/0247 |
|---|---|---|---|---|---|---|
| | | | | | | 429/429 |
| 2009/0130519 | A1 | * | 5/2009 | Sato | ..................... | H01M 8/0206 |
| | | | | | | 429/480 |
| 2012/0107714 | A1 | * | 5/2012 | Day | ..................... | H01M 8/0273 |
| | | | | | | 429/457 |

* cited by examiner

*Primary Examiner* — Thanh Truc Trinh
(74) *Attorney, Agent, or Firm* — WPAT, PC

(57) ABSTRACT

A flat plate type solid oxide fuel cell stack module is obtained by stacking a plurality of flat plate type solid oxide fuel cell stack units. Each of the cell stack unit comprises an anode plate, a cell unit and a cathode plate. The anode plate has a first flow channel, four corner first fuel input holes and a central first fuel output hole. The cathode plate has a second flow channel, a plurality of lateral second air input grooves and a plurality of lateral second air output grooves. The cell unit includes an anode layer, a cathode plate, four corner third fuel input holes and a central third fuel output hole. An anode mental net and an anode sealing material are disposed between the anode plate and the cell unit, a cathode mental net and a cathode sealing material are disposed between the cathode plate and the cell unit.

8 Claims, 17 Drawing Sheets

(51) Int. Cl.
*H01M 8/00* (2016.01)
*H01M 8/0263* (2016.01)
*H01M 8/0273* (2016.01)
*H01M 8/2483* (2016.01)
*H01M 8/2432* (2016.01)
*H01M 8/0271* (2016.01)
*H01M 8/1246* (2016.01)
*H01M 8/24* (2016.01)
*H01M 8/124* (2016.01)

(52) U.S. Cl.
CPC .. *H01M 8/2483* (2016.02); *H01M 2008/1293* (2013.01); *H01M 2300/0071* (2013.01); *Y02E 60/525* (2013.01); *Y02P 70/56* (2015.11)

(58) Field of Classification Search
CPC .... H01M 8/1246; H01M 8/24; H01M 8/2432; H01M 8/2483; Y02E 60/525; Y02P 70/56
See application file for complete search history.

FLAT PLATE TYPE SOLID OXIDE FUEL CELL STACK UNIT AND FLAT PLATE TYPE SOLID OXIDE FUEL CELL STACK MODULE

This application claims the benefit of Taiwan Patent Application Serial No. 103135990, filed Oct. 21, 2014, the subject matter of which is incorporated herein by reference.

BACKGROUND OF INVENTION

1. Field of the Invention

The invention relates to a flat plate type solid oxide fuel cell stack unit and flat plate type solid oxide fuel cell stack module, and more particularly to the cell stack unit and the cell stack module that are characterized on a reduced size, high efficiency, easy packing and assembly, and can easily and modularly vary the stack arrangement so as to meet the different specifications of the generation systems.

2. Description of the Prior Art

The solid oxide fuel cell (SOFC) is an energy conversion apparatus that utilizes the electrochemical reaction to convert the fuel into the respective electric energy for output. By further introducing an exhausted heat recycling system, the energy conversion efficiency of the SOFC generation system can be raised up to 80-90%. Further, the application size of the SOFC generation system can be small or portable sized for household, medical facilities, communities and so on, and may be large sized to serve a generation plant. Thus, all major countries in the world have been devoted huge money into developing the related technology of the SOFCs.

In order to produce more electricity while in applying the ordinary flat plate type SOFC stack, a pile of more than 10 SOFC units are usually laminated together to form a SOFC stack by proper in-serial connections among these SOFC units.

In the art, the conventional SOFC stack is assembled by laminating with end plates, panel frames, cell units, seal materials and metal contact layers. Obviously, such a manufacturing process is complicated and can only produce a larger-size cell stack module. Hence, the complexity in assembling the aforesaid conventional SOFC stack would be inevitable, and also the generation system having the SOFC stack is quite possible to have a low electric generation per unit volume.

SUMMARY OF THE INVENTION

Accordingly, it is the primary object of the present invention to provide a flat plate type solid oxide fuel cell stack unit and a flat plate type solid oxide fuel cell stack module, each of which is characterized on a reduced size, high efficiency and easy assembly and can easily and modularly vary the stack arrangement so as to enhance the merchandise competence of the SOFC products.

In the present invention, the flat plate type solid oxide fuel cell stack unit comprises an anode plate, a cathode plate, a cell unit, an anode metal net, a cathode metal net, at least one anode sealing material and at least one cathode sealing material.

The anode plate formed as a rectangle has a first flow channel structured on a surface thereof, four first fuel input holes located respectively to four corners thereof, and a first fuel output hole located at a center thereof.

The cathode plate shaped as a rectangle has a second flow channel structured on a surface thereof, four second fuel input holes located at respective corners thereof, a second fuel output hole located at a center thereof, a plurality of second air input grooves disposed along a lateral side thereof, and a plurality of second air output grooves disposed along another lateral side thereof opposing to the lateral side, wherein the second air input grooves, the second air output grooves and the second flow channel are all communicative in space.

The cell unit shaped as a rectangle has four third fuel input holes located at respective corners thereof, a third fuel output hole located at a center thereof, a cathode layer disposed at one side thereof to face the second flow channel, an anode layer disposed at another side thereof opposing to the side to face the first flow channel, wherein the four first fuel input holes, the four second fuel input holes and the four third fuel input holes are aligned respectively in positions, wherein the first fuel output hole, the second fuel output hole and the third fuel output hole are aligned respectively in positions.

The anode metal net is located between the anode plate and the cell unit.

The cathode metal net is located between the cathode plate and the cell unit.

The at least one anode sealing material is disposed between the anode plate and the cell unit to surround the first fuel input holes, the first fuel output hole, the first flow channel, the cell unit and the anode metal net.

The at least one cathode sealing material is disposed between the cathode plate and the cell unit to surround the second fuel input holes, the second fuel output hole, the second flow channel, the cell unit and the cathode metal net.

In the present invention, the flat plate type solid oxide fuel cell stack module is obtained by stacking a plurality of the aforesaid flat plate type solid oxide fuel cell stack units.

Accordingly, the flat plate type solid oxide fuel cell stack module comprises an anode plate, a cathode plate, a plurality of connection plates and a plurality of cell sets.

The anode plate formed as a rectangle has a first flow channel structured on a surface thereof, four first fuel input holes located respectively to four corners thereof, and a first fuel output hole located at a center thereof.

The cathode plate shaped as a rectangle has a second flow channel structured on a surface thereof, four second fuel input holes located at respective corners thereof, a second fuel output hole located at a center thereof, a plurality of second air input grooves disposed along a lateral side thereof, and a plurality of second air output grooves disposed along another lateral side thereof opposing to the lateral side, wherein the second air input grooves, the second air output grooves and the second flow channel are all communicative in space.

Each of the connection plates is shaped as a rectangle and has four eighth fuel input holes located at respective corners thereof, an eighth fuel output hole located at a center thereof, an anode flow channel area disposed on one side thereof, a cathode flow channel area disposed on another side thereof opposing to the side, a plurality of eighth air input grooves disposed along a lateral side of the side thereof having the cathode flow channel area, and a plurality of eighth air output grooves disposed along another lateral side thereof opposing to the lateral side, wherein the eight air input grooves, the eight air output grooves and the cathode flow channel area are all communicative in space.

Each of the cell units further includes an anode metal net, a cathode metal net, at least one anode sealing material and at least one cathode sealing material.

The cell unit shaped as a rectangle has four third fuel input holes located at respective corners thereof, a third fuel output hole located at a center thereof, a cathode layer disposed on one side thereof and an anode layer disposed on another side thereof opposing to the side.

The anode metal net is located between the anode plate and the cell unit.

The cathode metal net is located between the cathode plate and the cell unit.

The at least one anode sealing material is disposed on the side of the cell unit having the anode layer.

The at least one cathode sealing material is disposed on the side of the cell unit having the cathode layer.

In this cell stack module, one of the cell units is disposed between the anode plate and one of the connection plates, the anode sealing material of this cell unit is to surround the corresponding first fuel input holes, the corresponding first fuel output hole, the corresponding first flow channel, this cell unit and the corresponding anode metal net, and the cathode sealing material of this cell unit is to surround the corresponding eighth fuel input holes, the corresponding eighth fuel output hole, the corresponding cathode flow channel area, this cell unit and the corresponding cathode metal net.

In this cell stack module, another one of the cell units is disposed between the cathode plate and another one of the connection plates, the anode sealing material of this cell unit is to surround the corresponding eighth fuel input holes, the corresponding eighth fuel output hole, the corresponding anode flow channel area, this cell unit and the corresponding anode metal net, and the cathode sealing material of this cell unit is to surround the corresponding second fuel input holes, the corresponding second fuel output hole, the corresponding second flow channel, this cell unit and the corresponding cathode metal net.

In this cell stack module, one of the cell units is disposed between two neighboring said connection plates, the anode sealing material of this cell unit is to surround the corresponding eighth fuel input holes, the corresponding eighth fuel output hole, the corresponding anode flow channel area, this cell unit and the corresponding anode metal net, and the cathode sealing material of this cell unit is to surround the corresponding eighth fuel input holes, the corresponding eighth fuel output hole, the corresponding cathode flow channel area, this cell unit and the corresponding cathode metal net.

In this cell stack module, the anode layer of each of the cell units is to face the first flow channel of the corresponding anode plate and the cathode layer of each of the cell units is to face the second flow channel of the corresponding cathode plate.

In this cell stack module, the first fuel input holes, the second fuel input holes, the plurality of third fuel input holes and the plurality of eighth fuel input holes are aligned in respective positions, the first fuel output holes, the second fuel output holes, the third fuel output holes and the eighth fuel output holes are aligned in respective positions, the second air input grooves and the eighth air input grooves are aligned in respective positions, and the second air output grooves and the eighth air output grooves are aligned in respective positions.

All these objects are achieved by the flat plate type solid oxide fuel cell stack unit and the flat plate type solid oxide fuel cell stack module described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a flat plate type solid oxide fuel cell stack unit and a flat plate type solid oxide fuel cell stack module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
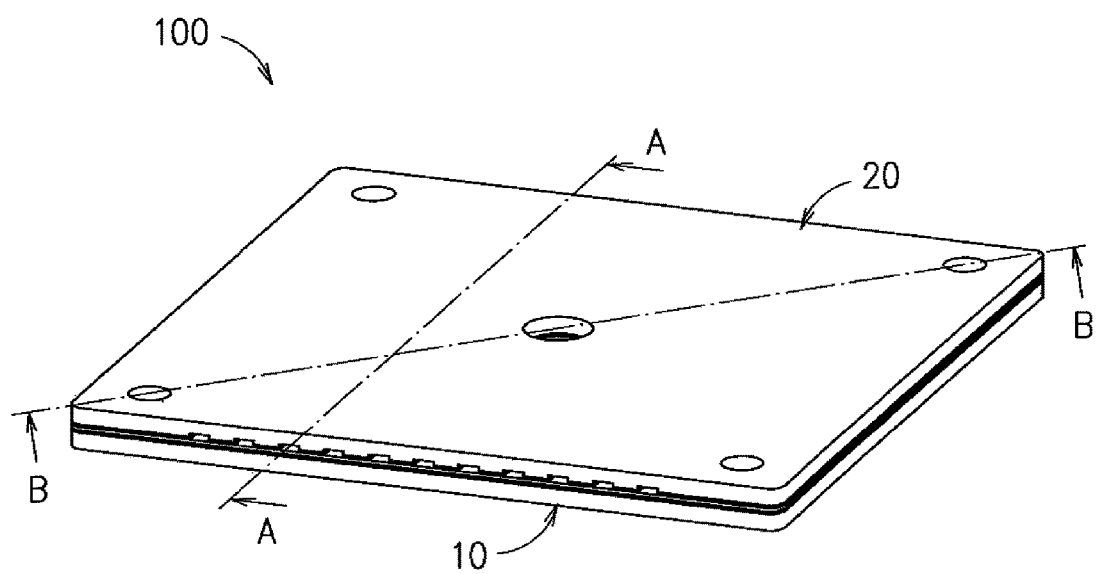
FIG. 1 is a schematic perspective view of a preferred embodiment of the flat plate type solid oxide fuel cell stack unit in accordance with the present invention.
Figure 2:
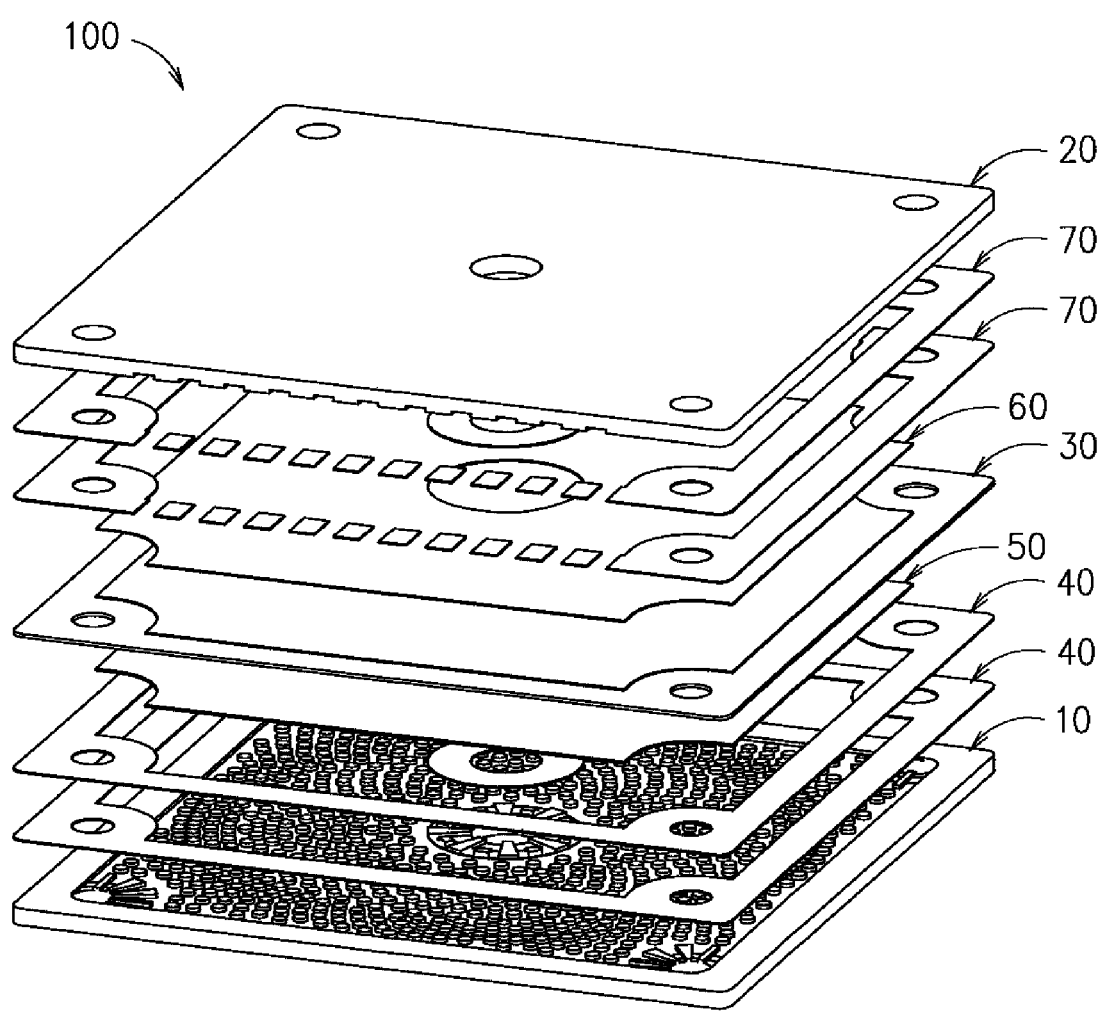
FIG. 2 is a schematic exploded view of FIG. 1.
Figure 3:
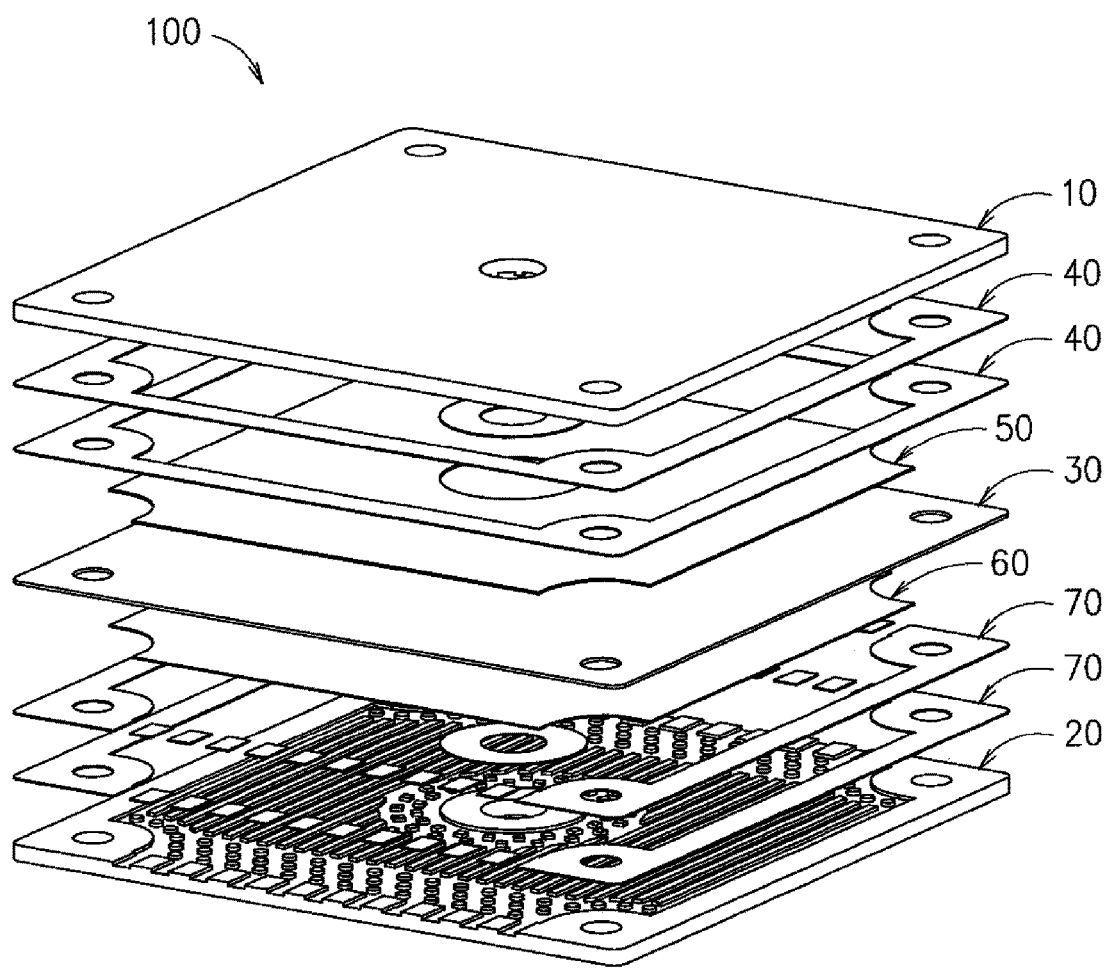
FIG. 3 is another view of FIG. 2.

Referring now to FIG. 1 through FIG. 3, a preferred embodiment of the flat plate type solid oxide fuel cell stack unit in accordance with the present invention is shown. The cell stack unit 100 includes an anode plate 10, a cathode plate 20, a cell unit 30, two sets of anode sealing materials 40, an anode metal net 50, a cathode metal net 60 and two sets of cathode sealing materials 70.

Figure 4:
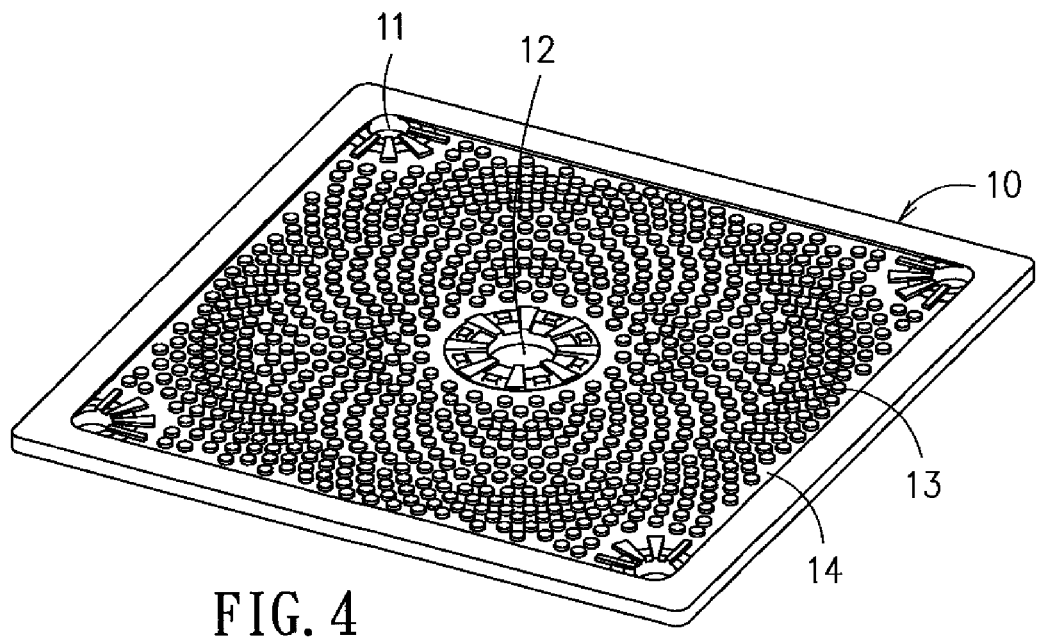
FIG. 4 shows the anode plate of FIG. 1.

Referring now to FIG. 4, the anode plate 10 formed as a rectangular plate has a first flow channel 14 structured on the top surface thereof, four first fuel input holes 11 located respectively to four corners thereof, and a first fuel output hole 12 located at the center thereof surrounded by the four first fuel input holes 11. The first fuel input holes 11 and the first fuel output hole 12 are all through holes communicating both sides of the anode plate 10. The first flow channel 14 is structured with a plurality of first bumps 13 on the top surface of anode plate 10 in FIG. 4, where the plurality of first bumps 13 are arranged to encircle the first fuel output hole 12. In particular, the plurality of first bumps 13 are arranged symmetrically along circles with different radiuses to the center point of the first fuel output hole 12.

Figure 5:
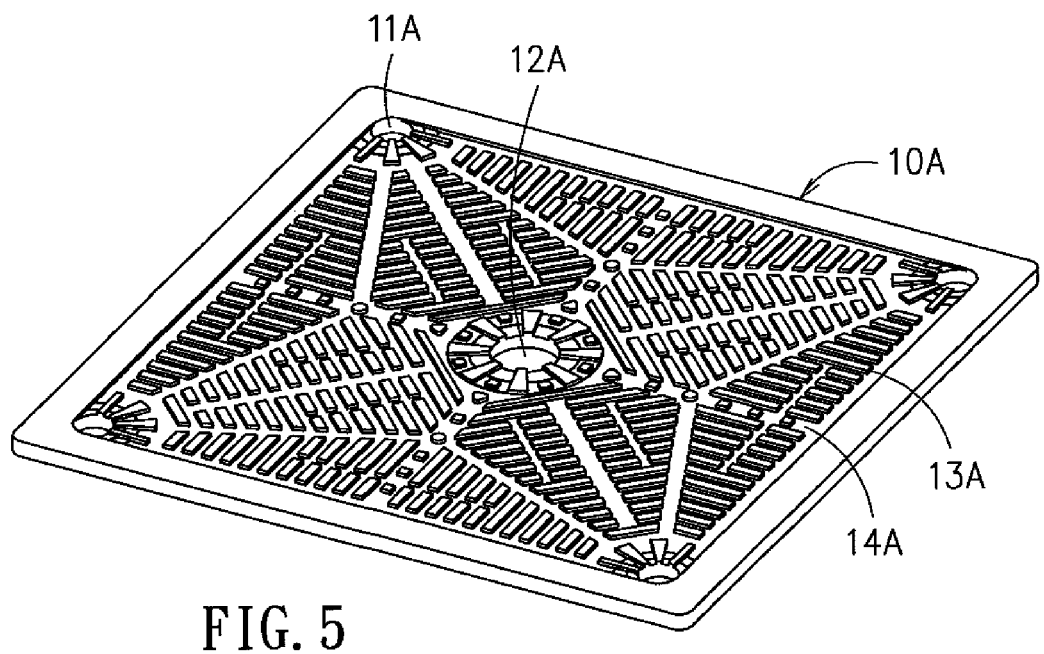
FIG. 5 through FIG. 10 demonstrate other embodiments of the anode plate in accordance with the present invention.
Figure 6:
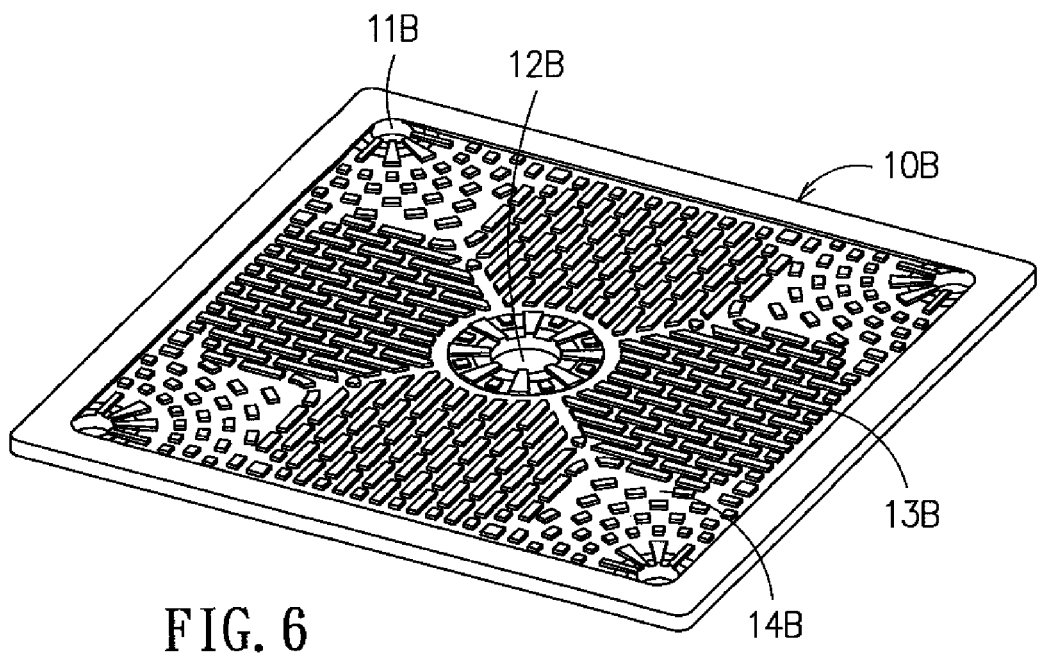
Figure 7:
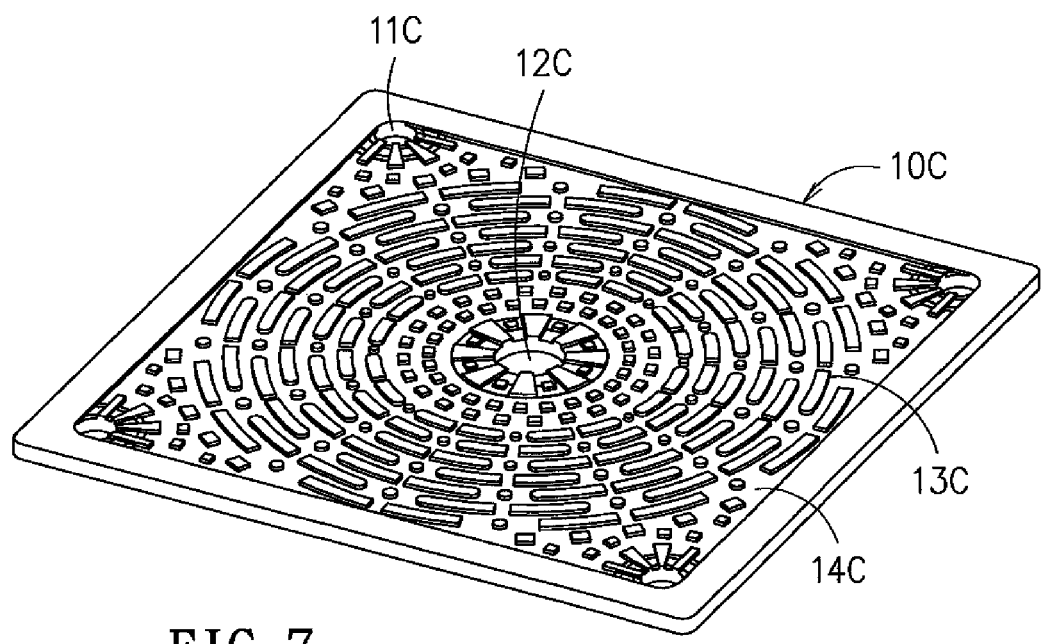
Figure 8:
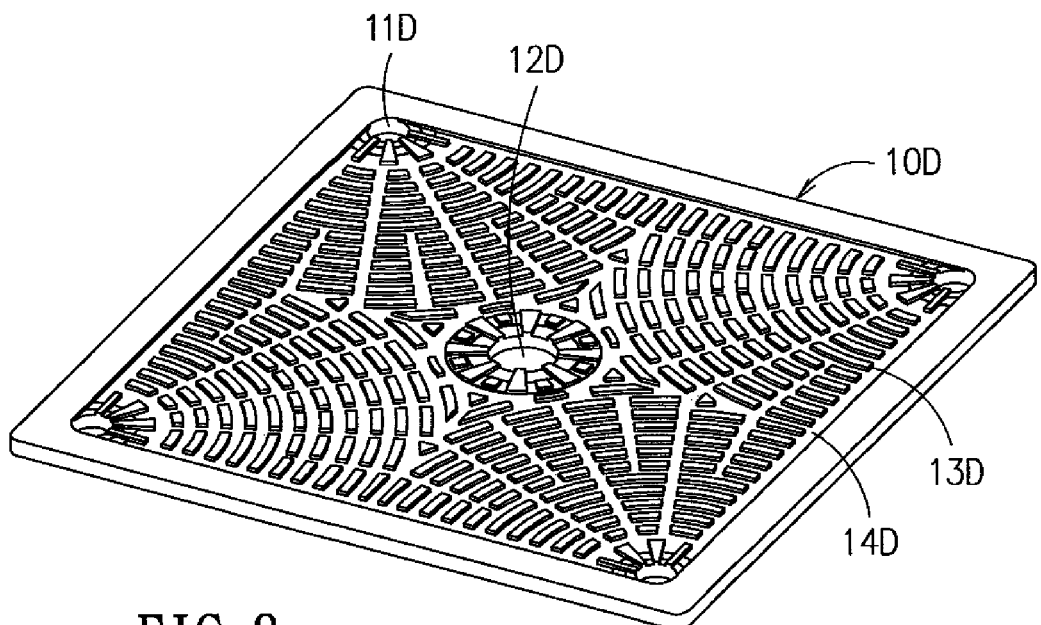
Figure 9:
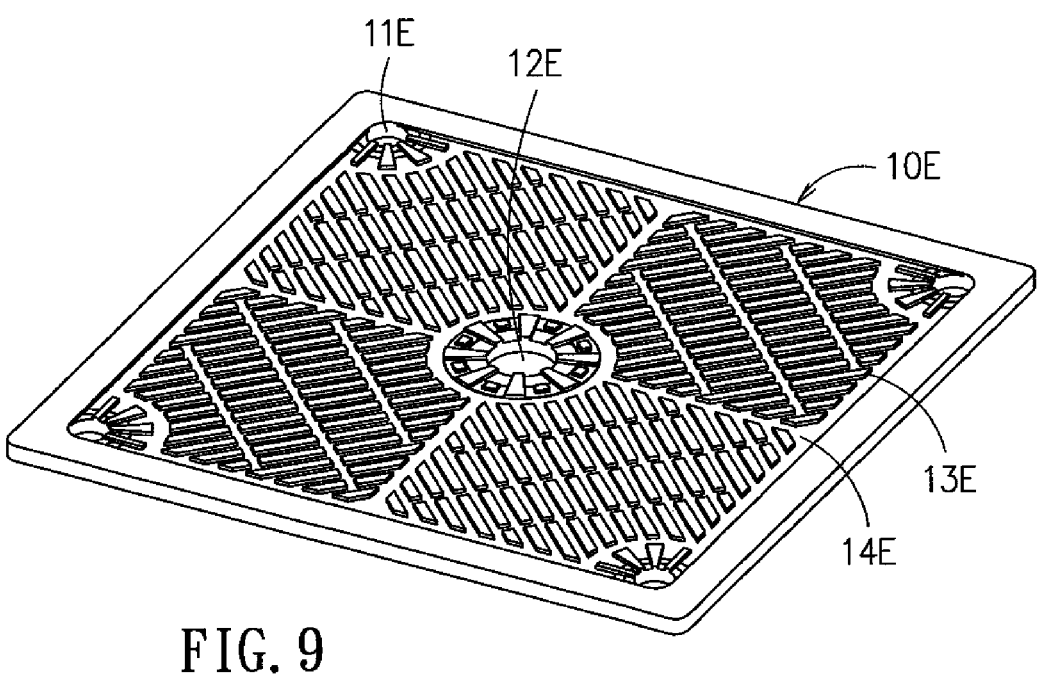
Figure 10:
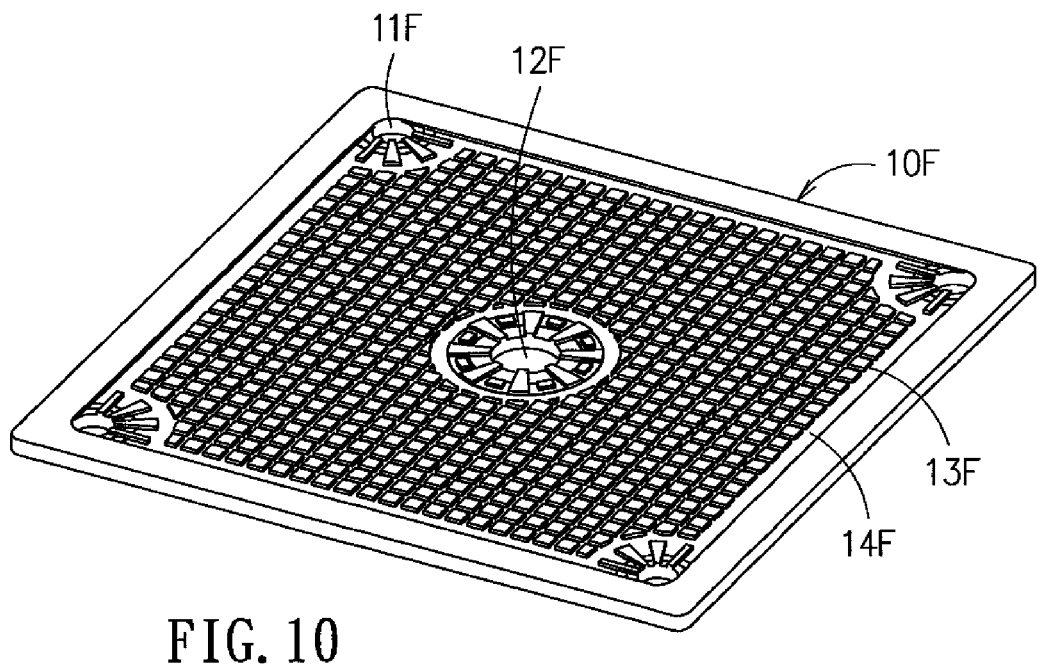

Referring to FIG. 5 through FIG. 10, various patterns of structures on the top surface of the anode plate are shown, respectively. In FIG. 5, the anode plate 10A has four first fuel input holes 11A, a first fuel output hole 12A, a plurality of first bumps 13A and a first flow channel 14A. In FIG. 6, the anode plate 10B has four first fuel input holes 11B, a first fuel output hole 12B, a plurality of first bumps 13B and a first flow channel 14B. In FIG. 7, the anode plate 10C has four first fuel input holes 11C, a first fuel output hole 12C, a plurality of first bumps 13C and a first flow channel 14C. In FIG. 8, the anode plate 10D has four first fuel input holes 11D, a first fuel output hole 12D, a plurality of first bumps 13D and a first flow channel 14D. In FIG. 9, the anode plate 10E has four first fuel input holes 11E, a first fuel output hole 12E, a plurality of first bumps 13E and a first flow channel 14E. In FIG. 10, the anode plate 10F has four first fuel input holes 11F, a first fuel output hole 12F, a plurality of first bumps 13F and a first flow channel 14F. The major difference between any of the anode plates 10A~10F of FIG. 5~FIG. 10 and the anode plate 10 of FIG. 4 is the difference of the arrangement and the formation of the first bumps 13~13F. Nevertheless, no matter what kind of the arrangement and the formation of the first bumps is, all these first bumps 13, 13A~13F are all surrounding the first fuel output hole 12~12F in a symmetrical manner. Upon such an arrangement, the flow field on the anode plate 10~10F can be evenly distributed. Also, any of the anode plates 10~10F of FIG. 4~FIG. 10 is rectangular shaped with the four first fuel input holes 11~11F located to the four corners, and with the fuel output holes 12~12F at the center thereof, such that the arrangement of the first bumps 13~13F in accordance with the symmetrical manner can be easily provided. Namely, if the anode plate is other shaped, then the fuel input holes and the fuel output hole shall be embodied in a pattern other than any of FIG. 4~FIG. 10. In the present invention, the formation of the first bumps shall not be limited to that in any of FIG. 4~FIG. 10. As described above, any formation of the first bumps can be a candidate if and only if the formation of the bumps can achieve the goal of an even-distributed flow field. Further, by having FIG. 4 as an example, part of the first bumps 13 can be treated as supportive nodes for enhancing the structural strength and for bifurcating and disturbing the flow in the first flow channel 14~14F.

Figure 11:
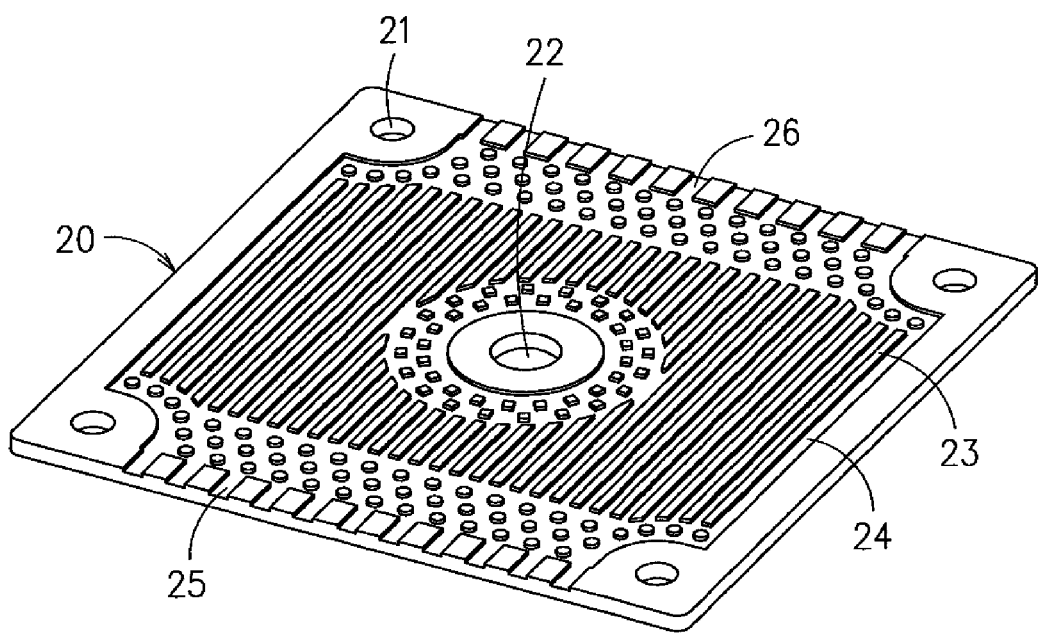
FIG. 11 shows the cathode plate of FIG. 1.

Referring now to FIG. 11, the cathode plate 20 shaped as a rectangle has a second flow channel 24 structured on the top surface thereof, four second fuel input holes 21 located at respective corners thereof and a second fuel output hole 22 located at the center thereof. The plurality of second fuel input holes 21 are to surround the second fuel output hole 22, and the second fuel input holes 21 and the second fuel output hole 22 are all through holes for communicating both sides of the cathode plate 20. The second flow channel 24 is configured by a plurality of second bumps 23, in which the plurality of second bumps 23 are arranged to encircle the second fuel output hole 22. In particular, the plurality of second bumps 23 are arranged symmetrically along circles with different radiuses to the center point of the second fuel output hole 22. In one lateral side of the cathode plate 20, a plurality of second air input grooves 25 are disposed, while a plurality of second air output grooves 26 are disposed along the opposing lateral side thereof. As shown, the second air input grooves 25, the second air output grooves 26 and the second flow channel 24 are all communicative in space. In this embodiment, the second bumps 23 include various shapes of bumps, such as a plurality of parallel longitudinal strips extending in a direction parallel to the second air input grooves 25 and the second air output grooves 26, such that the air can smoothly flow from the second air input grooves 25, through the second flow channel 24, and finally to the second air output grooves 26.

Figure 12:
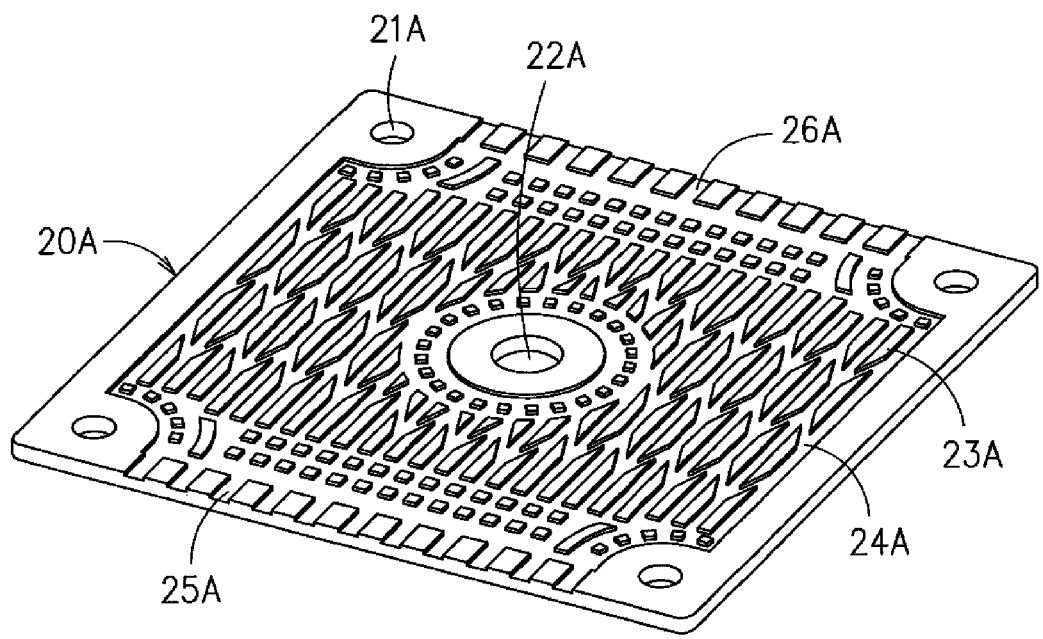
FIG. 12 and FIG. 13 demonstrate two other embodiments of the cathode plate in accordance with the present invention.
Figure 13:
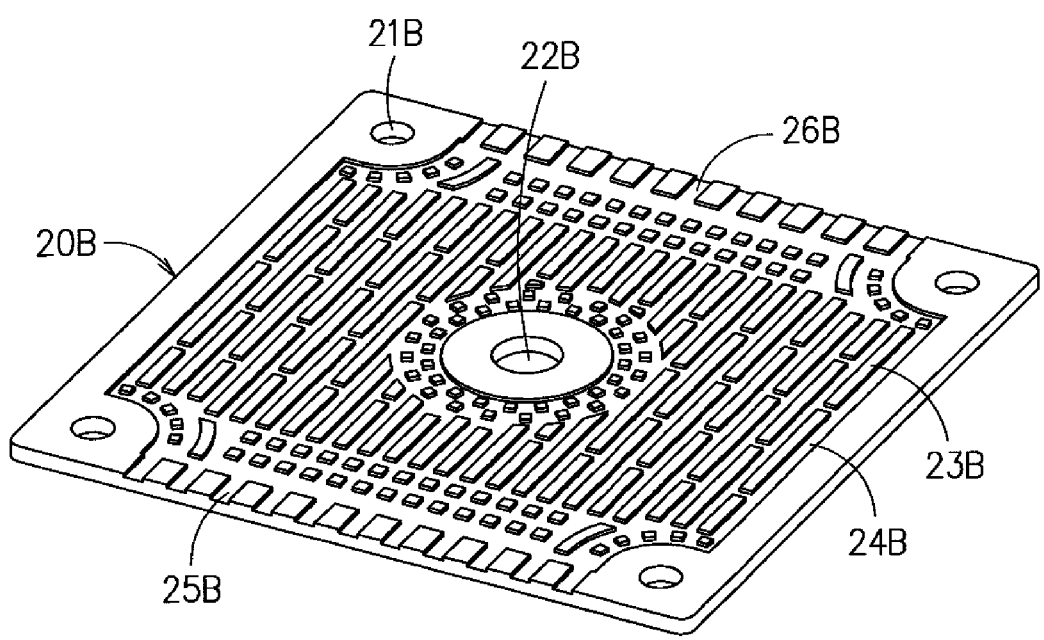

Referring now to FIG. 12 and FIG. 13, other two patterns of structures on the top surface of the cathode plate are shown, respectively. In FIG. 12, the cathode plate 20A has four second fuel input holes 21A, a second fuel output hole 22A, a plurality of second bumps 23A, a second flow channel 24A, a plurality of second air input grooves 25A and a plurality of second air output grooves 26A. In FIG. 13, the cathode plate 20B has four second fuel input holes 21B, a second fuel output hole 22B, a plurality of second bumps 23B, a second flow channel 24B, a plurality of second air input grooves 25A and a plurality of second air output grooves 26A. The major difference between any of the cathode plates 20A~10B of FIG. 12~FIG. 13 and the cathode plate 20 of FIG. 11 is the difference of the arrangement and the formation of the second bumps 23~23F. Nevertheless, no matter what kind of the arrangement and the formation of the second bumps is, all these second bumps 23~23B are all surrounding the second fuel output hole 22~22A in a symmetrical manner including parallel longitudinal strip or island structures. In particular, the extending direction of these island structures are parallel to that of the second air input grooves 25A, 25B and the second air output grooves 26A, 26B. Upon such an arrangement, the flow field on the cathode plate 20~20B can be evenly distributed. As shown in FIG. 11~FIG. 13, the cathode plates 20~20B are rectangular shaped, the four second fuel input holes 21~21B are located to respective corners, the second fuel output holes 22~22B are centrally located, the second air input grooves 25~25B, and the second air output grooves 26~26B are parallel extending. Further, the second bumps 23~23B are symmetrically arranged and in a longitudinal island structures. Namely, Namely, if the cathode plate is other shaped, then the fuel input holes, the fuel output hole, the air input grooves and the air output grooves shall be embodied in a pattern other than any of FIG. 11~FIG. 13. In the present invention, the formation of the second bumps shall not be limited to that in any of FIG. 11~FIG. 13. Further, by having FIG. 11 as an example, part of the second bumps 23 can be treated as supportive nodes for enhancing the structural strength and for bifurcating and disturbing the flow in the second flow channel 24~24B.

In the present invention, the material for the anode plates 10~10F of FIG. 4~FIG. 10 and the cathode plates 20~20B of FIG. 11~FIG. 13 can be one of a high temperature alloy and an electric conductive material, such as a high nickel alloy, a stainless steel 441, a Crofer 22 and so on.

Figure 14:
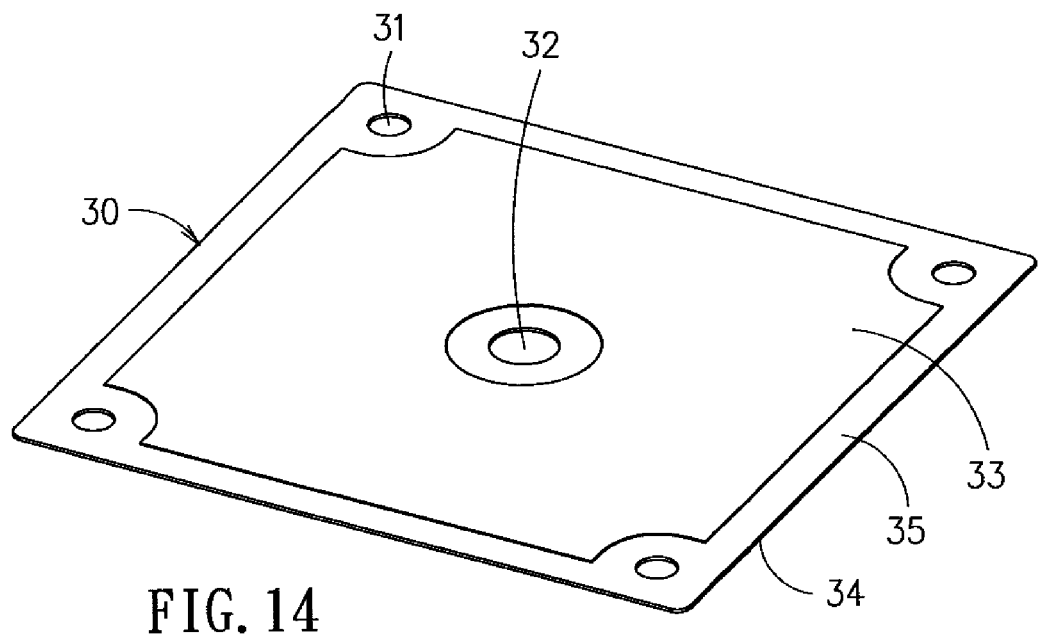
FIG. 14 shows the cell unit of FIG. 1.

Referring now to FIG. 14, the cell unit 30 formed as a rectangle has four third fuel input holes 31 located at respective corners thereof and a third fuel output hole 32 located at the center thereof. The plurality of third fuel input holes 31 are to surround the third fuel output hole 32, and the third fuel input holes 31 and the third fuel output hole 32 are all through holes for communicating both sides of the cell unit 30. Two opposing sides of the cell unit 30 are disposed with a cathode layer 33 and an anode layer 34, respectively. An electrolyte layer 35 is disposed between the cathode layer 33 and the anode layer 34. The anode plate 10 is mounted onto the cell unit 30 at the side having the anode layer 34 in a manner of the first flow channel 14 facing the anode layer 34. The cathode plate 20 is mounted onto the cell unit 30 at the side having the cathode layer 33 in a manner of the second flow channel 24 facing the cathode layer 33. The cell unit 30 is mainly to fit a generation system, and thus the shape thereof is not limited to the aforesaid rectangle. If the cell unit 30 is other shaped, shapes of the anode plate 10~10F of FIG. 4~FIG. 10 and the cathode plate 20~20B of FIG. 11~FIG. 13 are varied accordingly. The cell unit 30 can be an anode-supported planar SOFC or an electrolyte-supported planar SOFC. If the anode-supported planar SOFC made of NiO, YSZ and LSM is applied, a functional layer shall be included for enhancing ion transmission and electron conduction thereof so as to promote the integral performance. In the present invention, the cell unit 30 can have (but not limited to) a size of 10.8 cm×10.8 cm.

Figure 15:
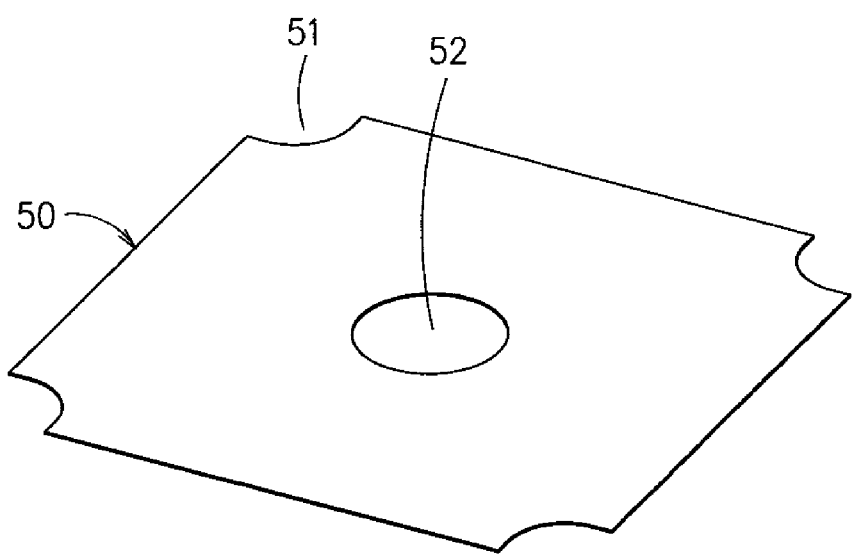
FIG. 15 shows the anode metal net of FIG. 1.

Referring now to FIG. 2, FIG. 14 and FIG. 15, the anode metal net 50 formed as a rectangle to be mounted onto the anode layer 34 of the cell unit 30 has four cutouts 51 at respective corners thereof and a hole 52 at the center thereof. The hole 52 is to avoid possible installation interference between the anode metal net 50 and the anode sealing material 40. In the present invention, candidate shape for the anode metal net 50 is not limited to the shape shown in the illustrated embodiment, but is to satisfy the criterion that is able to contact the anode layer 34 of the cell unit 30 without influencing the inflow and outflow of the fuel.

Figure 16:
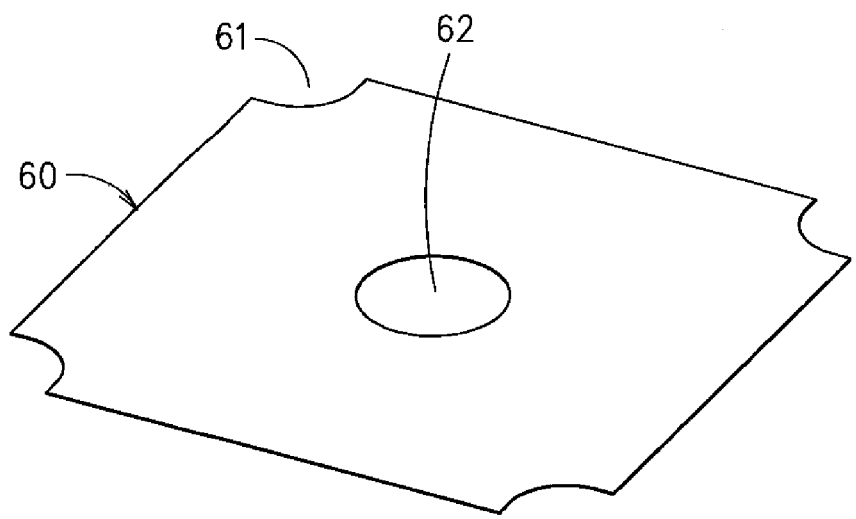
FIG. 16 shows the cathode metal net of FIG. 1.

Referring now to FIG. 2, FIG. 14 and FIG. 16, the cathode metal net 60 formed as a rectangle to be mounted onto the cathode layer 33 of the cell unit 30 has four cutouts 61 at respective corners thereof and a hole 62 at the center thereof. The hole 62 is to avoid possible installation interference between the cathode metal net 60 and the cathode sealing material 70. In the present invention, candidate shape for the cathode metal net 60 is not limited to the shape shown in the illustrated embodiment, but is to satisfy the criterion that is able to contact the cathode layer 33 of the cell unit 30 without influencing the inflow and outflow of the fuel.

Figure 17:
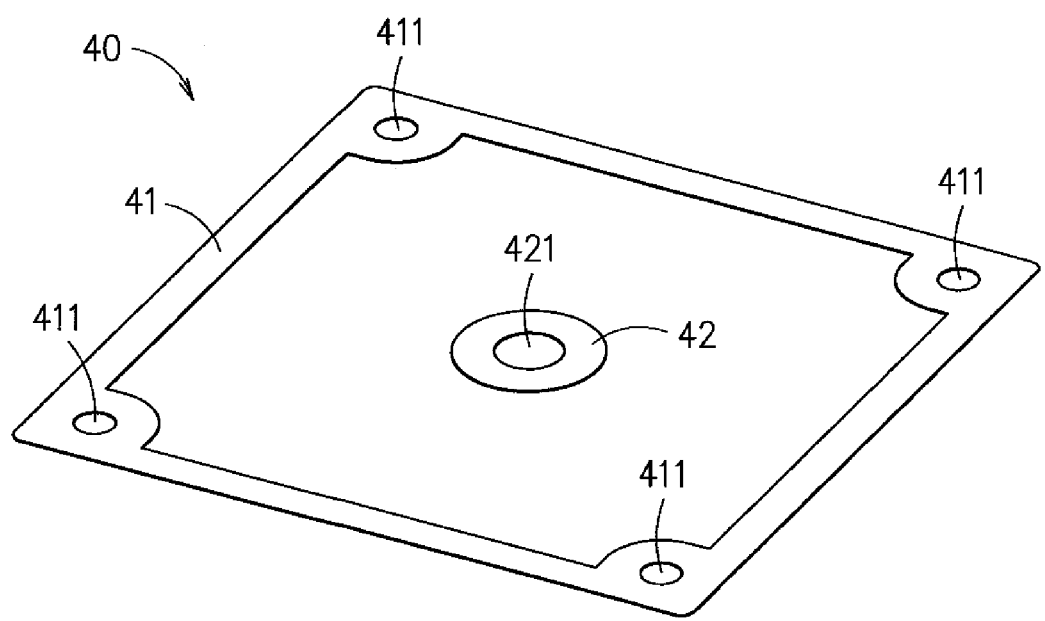
FIG. 17 shows the anode sealing material of FIG. 1.

Referring now to FIG. 2 and FIG. 17, the anode sealing material 40 disposed between the anode plate 10 and the cell unit 30 is consisted of a rectangular frame portion 41 and a circular portion 42. The rectangular frame portion 41 has four corners to dispose fourth respective fuel input holes 411. A fourth fuel output hole 421 is disposed at the center of the circular portion 42.

Figure 18:
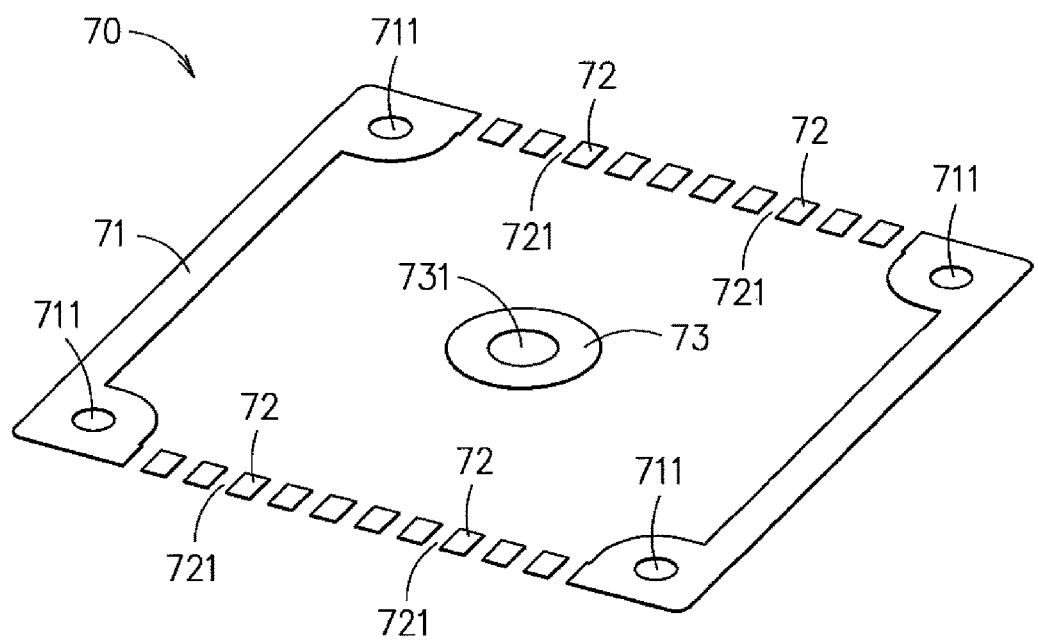
FIG. 18 shows the cathode sealing material of FIG. 1.

Referring now to FIG. 2 and FIG. 18, the cathode sealing material 70 disposed between the cathode plate 20 and the cell unit 30 is consisted of two longitudinal portions 71, a plurality of rectangular portions 72 and a circular portion 73, in which the two longitudinal portions 71 and the plurality of rectangular portions 72 are integrated to form a hollow rectangular frame having four corners disposed with respective seventh fuel input holes 711. Between every two neighboring rectangular portions, a passage 721 is formed. A seventh fuel output hole 731 is disposed at the center of the circular portion 73.

Referring now to FIG. 2, FIG. 17 and FIG. 18, the anode sealing material 40 and the cathode sealing material 70 are to serve an air-tight purpose for the engagement of the anode plate 10, the cell unit 30 and the cathode plate 20 so as to be insulated from the anode metal net 50 and the cathode metal net 60. In the present invention, the anode sealing material 40 and the cathode sealing material 70 can be made of a ceramic material, a mixed material of ceramics and glass, or a proper insulation material such as $Al_2O_3$ or $SiO_2$—$B_2O_3$—$Al_2O_3$—$BaO$ glass-ceramics.

In accordance with the air-tightness and the insulation, shapes of the anode sealing material 40 and cathode sealing material 70 are not limited to the illustrated embodiments. For the anode sealing material 40, an acceptable shape should meet the characteristics of surrounding the first fuel input holes 11, the first fuel output hole 12, the first flow channel 13, the cell unit 30 and the anode metal net 50, not to interference inflow and outflow of the fuel, sealing tightly the anode plate 10 and the cell unit 30, and insulating the anode metal net 50. On the other hand, for the cathode sealing material 70, an acceptable shape should meet the characteristics of surrounding the second fuel input holes 21, the second fuel output hole 22, the second flow channel 24, the cell unit 30 and the cathode metal net 60, not to interference the input and output of the air and the fuel, sealing tightly the cathode plate 20 and the cell unit 30, and insulating the cathode metal net 60. In FIG. 2 and FIG. 3, two sets of the anode sealing material 40 and two sets of the cathode sealing material 70 are included. However, it shall be understood that the application of the anode sealing material 40 and the cathode sealing material 70 are various in shapes and numbers, but meet the practical needs.

Figure 19:
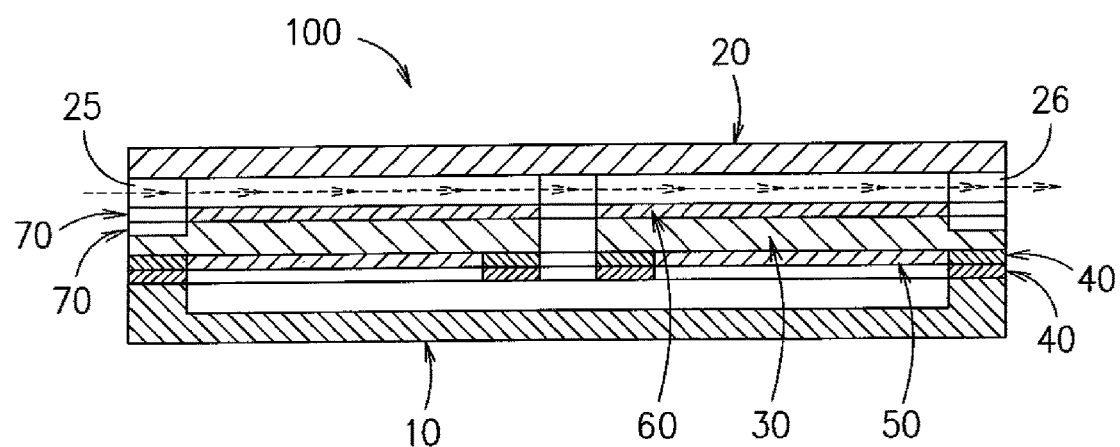
FIG. 19 is a cross-sectional view of FIG. 1 along line A-A.
Figure 20:
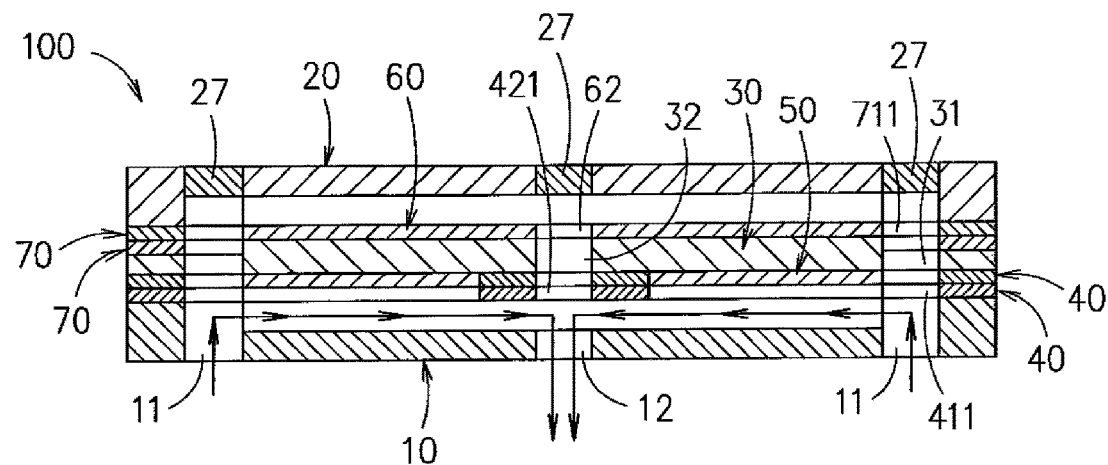
FIG. 20 is a cross-sectional view of FIG. 1 along line B-B.

Referring now to FIG. 19 and FIG. 20, the anode plate 10, the anode sealing material 40, the anode metal net 50, the cell unit 30, the cathode metal net 60, the cathode sealing material 70 and the cathode plate 20 are laminated in order, in which the first fuel input holes 11, the fourth fuel input holes 411, the third fuel input holes 31, the seventh fuel input holes 711, and the second fuel input holes 21 should be aligned in positions, and also the first fuel output hole 12, the fourth fuel output hole 421, the third fuel output hole 32, the seventh fuel output hole 731, and the second fuel output hole 22 shall be aligned in positions (referred also to FIG. 2.

As shown in FIG. 19, the air flows in the cell stack unit 100 via the second air input grooves 25, through cathode metal net 60, and out of the cell stack unit 100 via the second air output grooves 26 (as the dash-arrowed path).

Referring to FIG. 19 and FIG. 20, while in application, for the second fuel input holes 21 and the second fuel output hole 22 are disposed with the seal material 27, the fuel can flow in the cell stack unit 100 via the first fuel input holes 11, through the anode metal net 50, and leave the cell stack unit 100 via the first fuel output hole 12 (as the solid-arrowed path). The material for the seal material 27 is not limited to a specific one, and can adopt the same material for the cathode plate 20, a metal or ceramics with a sealing material for inhibiting leak of the fuel.

Figure 21:
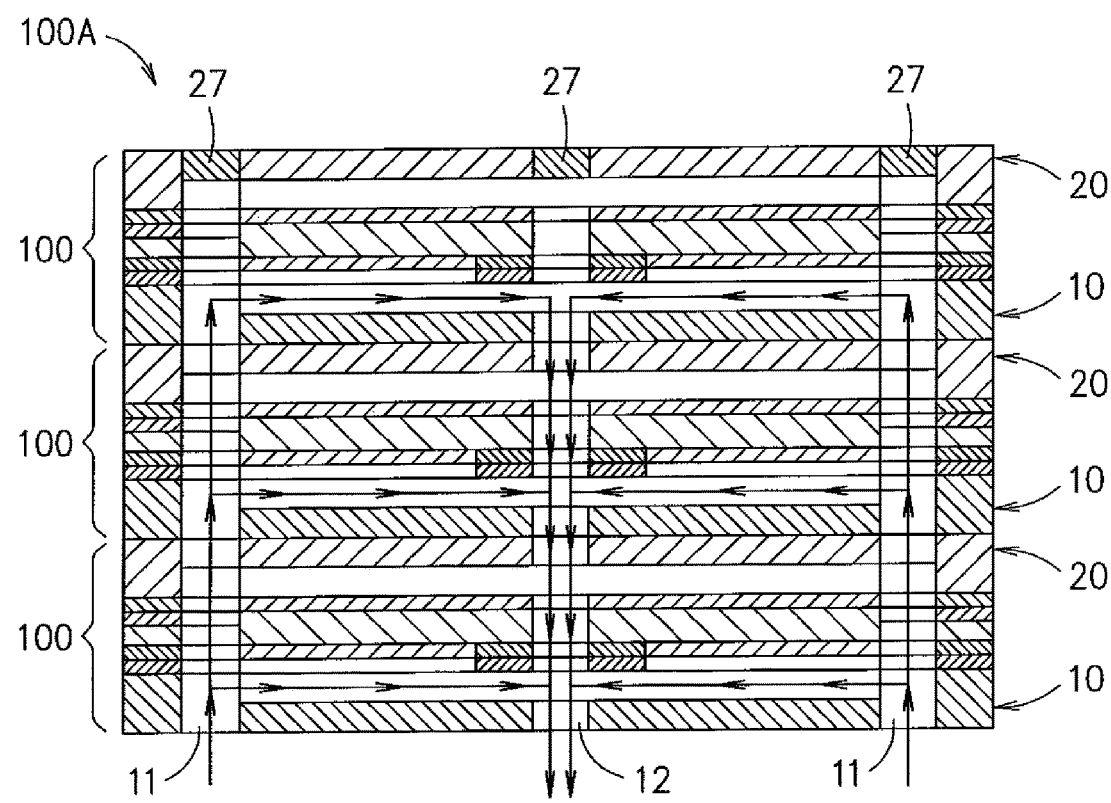
FIG. 21 is a schematic cross-sectional view of a preferred embodiment of the flat plate type solid oxide fuel cell stack module in accordance with the present invention.

Referring now to FIG. 21, a preferred embodiment of the flat plate type solid oxide fuel cell stack module in accordance with the present invention is shown. The cell stack module 100A is produced by stacking a plurality the cell stack units 100 of FIG. 1 in a laminating manner. Each of the cell stack units 100 is piled by having the anode plate 10 as the bottom to top the cathode plate 20 of a lower cell stack unit 100. The seal material 27 is disposed into the second fuel input holes 21 and the second fuel output hole 22 of the top cathode plate 20 so as to all the fuel input holes and the fuel output holes of the cell stack module 100A to be communicative in space. The fuel enters each of the cell stack units 100 from the respective first fuel input holes 11, flows through the respective anode metal nets 50, and then leave the cell stack module 100A via the first fuel output hole 12 at the bottom of the cell stack module 100A (as the solid-arrowed path).

Figure 22:
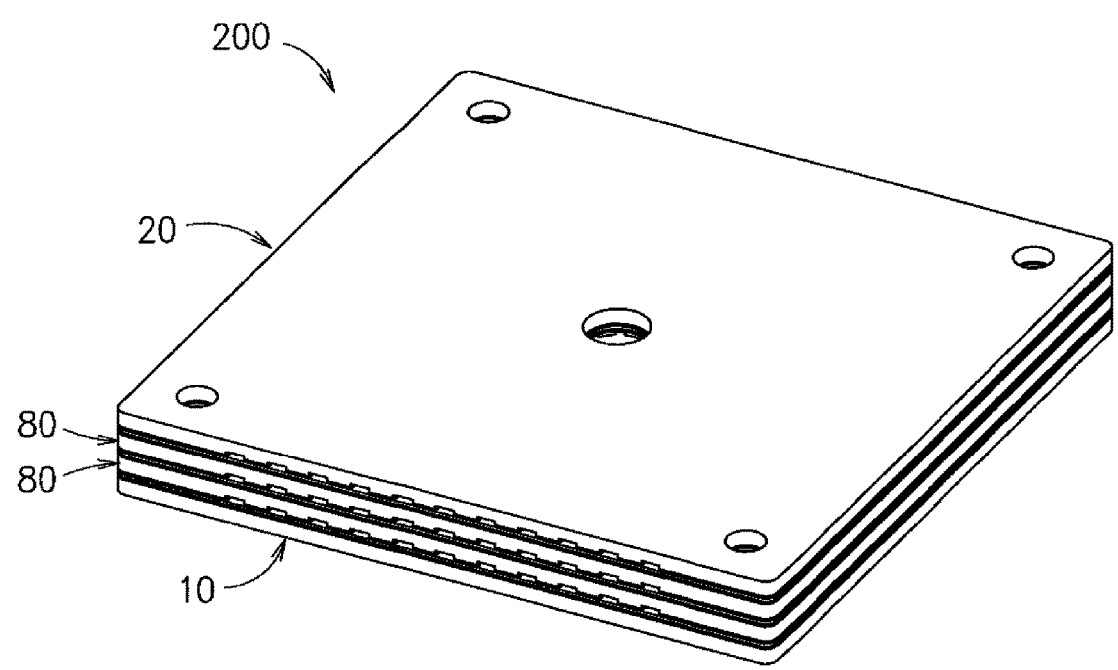
FIG. 22 is a schematic perspective view of FIG. 21.
Figure 23:
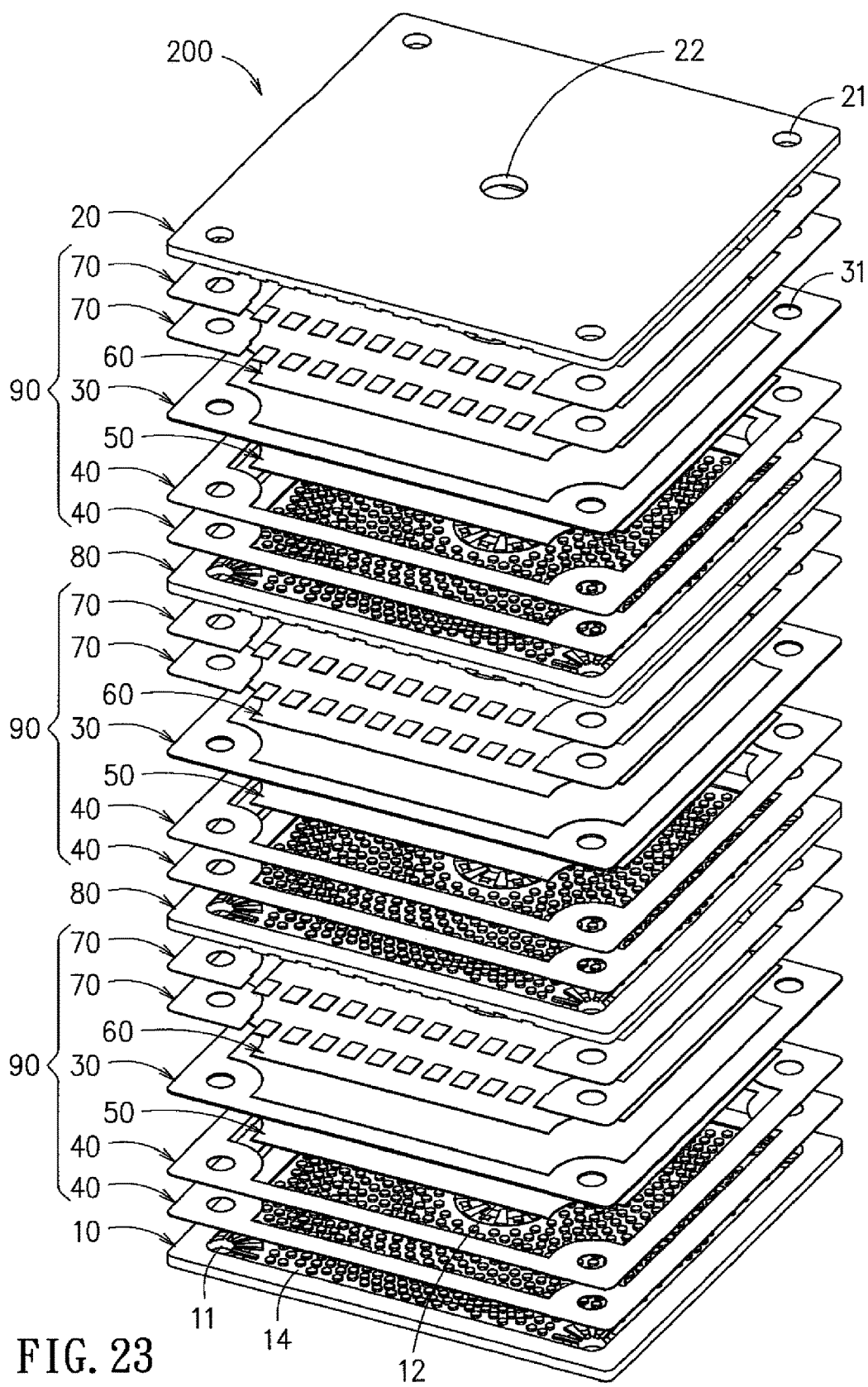
FIG. 23 is a schematic exploded view of FIG. 22.
Figure 24:
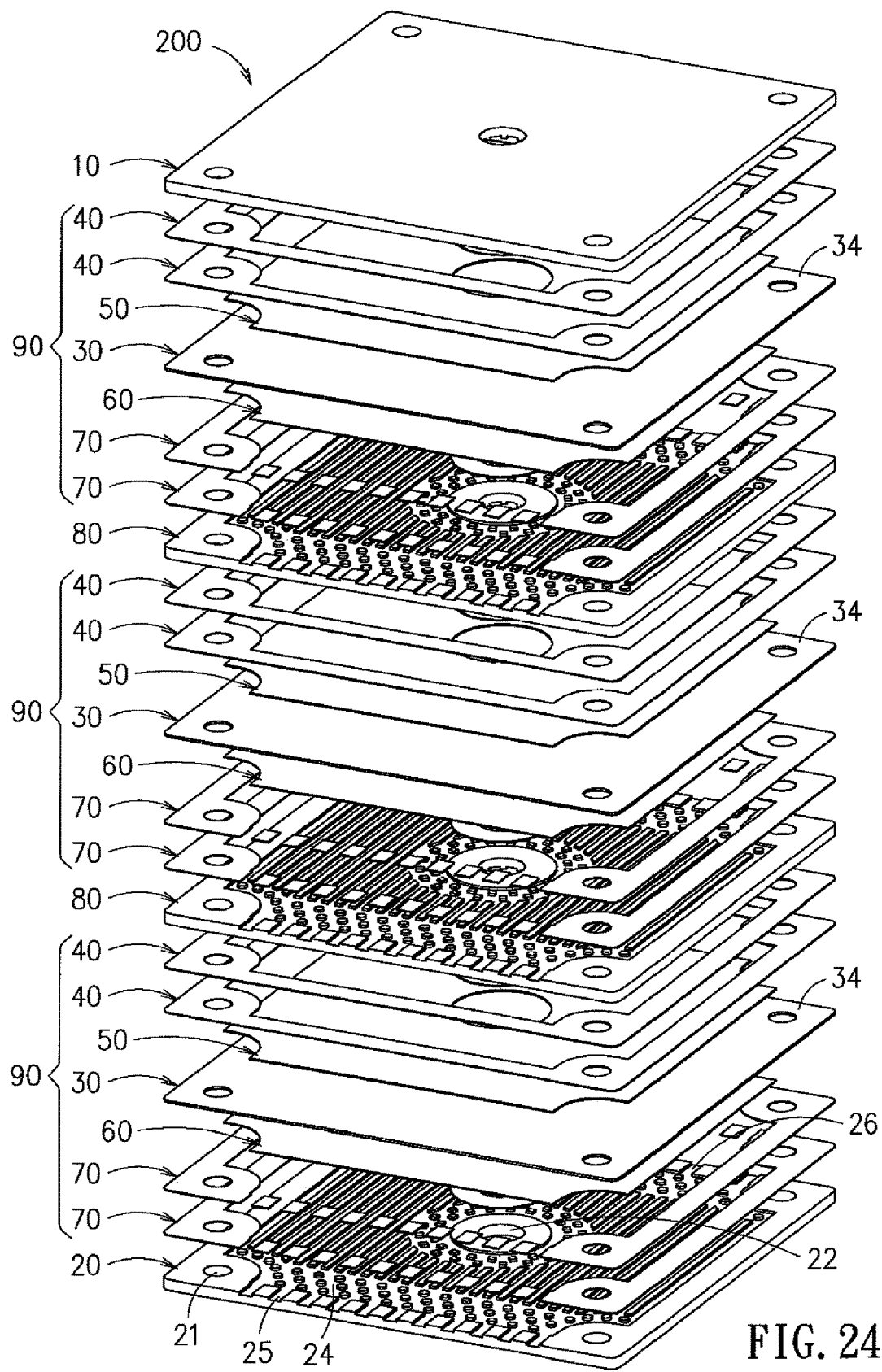
FIG. 24 is another view of FIG. 23.

Referring now to FIG. 22 through FIG. 24, an embodiment of the flat plate type solid oxide fuel cell stack module in accordance with the present invention is shown. The cell stack module 200 includes an anode plate 10, a cathode plate 20, a plurality of connection plates 80 and a plurality of cell sets 90. In this embodiment with three cell sets 90, two connection plates 80 are required to separate the cells. It is noted that the anode plate 10 and the cathode plate 20 are structured as the same as the corresponding anode plate 10 and cathode plate 20 of FIG. 2.

Figure 25:
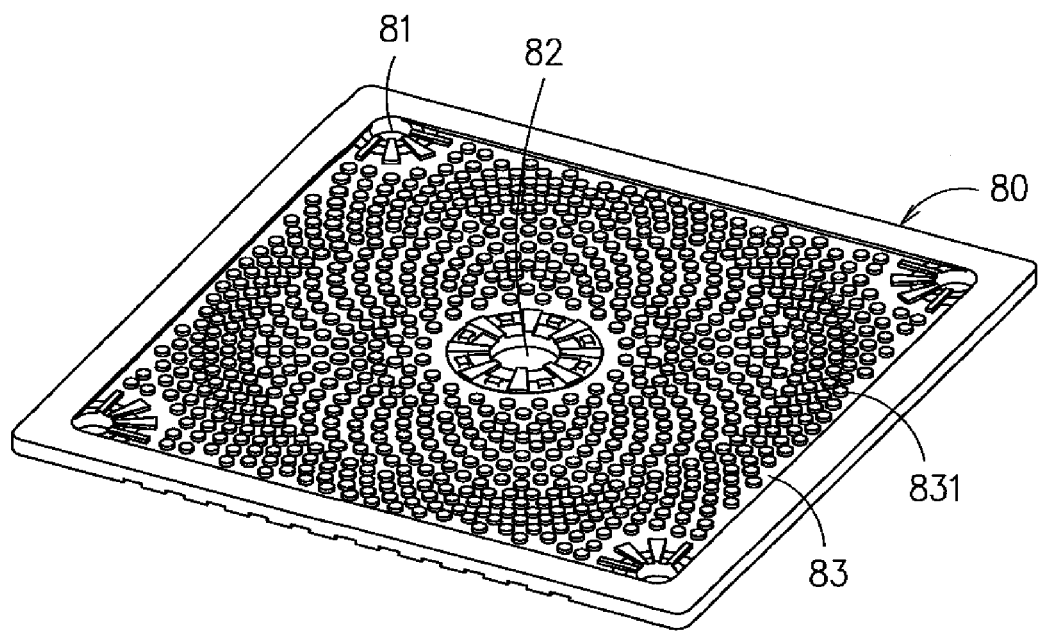
FIG. 25 shows the connection plate of FIG. 23.
Figure 26:
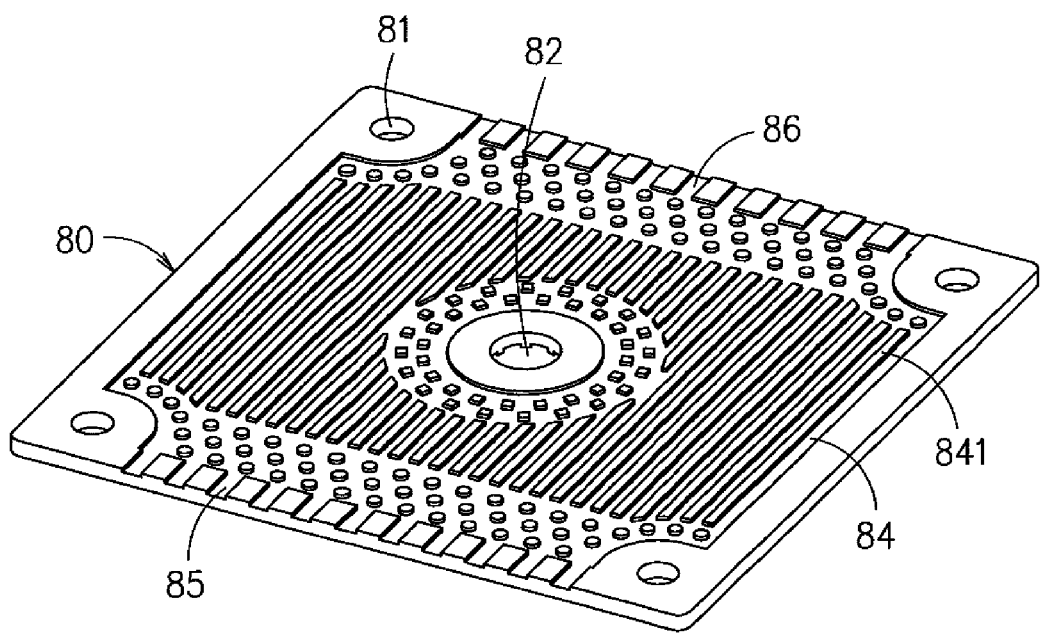
FIG. 26 is another view of FIG. 25.

Referring now to FIG. 25 and FIG. 26, the connection plate 80 shaped as a rectangle has four eighth fuel input holes 81 located at respective corners thereof and an eighth fuel output hole 82 located at the center thereof. The plurality of eighth fuel input holes 81 are to surround the eighth fuel output hole 32, and the eighth fuel input holes 81 and the eighth fuel output hole 82 are all through holes for communicating both sides of the connection plate 80. Two opposing sides of the connection plate 80 are defined as an anode flow channel area 83 and a cathode flow channel area 84, respectively. The anode flow channel area 83 is disposed with a plurality of anode bumps 831, where the plurality of anode bumps 831 encircle the eighth fuel output hole 82 in a manner of being arranged symmetrically along circles with different radiuses to the center point of the eighth fuel output hole 82. In the cathode flow channel area 84, a plurality of cathode bumps 841 are disposed, where the plurality of cathode bumps 841 encircle the eighth fuel output hole 82 in a manner of being arranged symmetrically along circles with different radiuses to the center point of the eighth fuel output hole 82. At a lateral side of the connection plate 80 on the surface defining the cathode flow channel area 84, a plurality of parallel eighth air input grooves 85 are constructed. At the other lateral side on the same surface of the connection plate 80, a plurality of parallel eighth air output grooves 86 are constructed by opposing to the eighth air input grooves 85. The eighth air input grooves 85, the eighth air output grooves 86 and the cathode flow channel area 84 are all communicative in space. The cathode bumps 841 may be various formed, including a plurality of parallel longitudinal island structures extending parallel to the eighth air input grooves 8 and the eighth air output grooves 86. In this embodiment, the cathode flow channel area 84 can be embodied as that of the cathode plate 20. The connection plate 80 can be one of a high temperature alloy and an electric conductive material, such as a high nickel alloy, a stainless steel 441, a Crofer 22 and so on. In this embodiment, the anode flow channel area 83 can be structured by resembling to the first flow channel 14 of the anode plate 10. Similarly, the cathode flow channel area 84 can be structured by resembling to the second flow channel 24 of the cathode plate 20.

Referring to FIG. 23 through FIG. 26, the cell set 90 includes a cell unit 30, two anode sealing materials 40, an anode metal net 50, a cathode metal net 60 and two cathode sealing materials 70. The cell unit 30, the anode sealing material 40, the anode metal net 50, the cathode metal net 60 and the cathode sealing material 70 of this embodiment can be engineered by resembling to the cell unit 30, the anode sealing material 40, the anode metal net 50, the cathode metal net 60 and the cathode sealing material 70 of FIG. 2.

In this embodiment, the lower cell set 90 is disposed between the anode plate 10 and the lower connection plate 80. The anode sealing material 40 of the cell set 90 is mounted to surround the first fuel input holes 11, the first fuel output hole 12, the first flow channel 14, the cell unit 30 and the anode metal net 50. Similarly, the cathode sealing material 70 of the cell set 90 is mounted to surround the eighth fuel input holes 81, the eighth fuel output hole 82, the cathode flow channel area 84, the cell unit 30 and the cathode metal net 60.

On the opposite end of this embodiment, the upper cell set 90 is disposed between the cathode plate 20 and the upper connection plate 80. The anode sealing material 40 of the cell set 90 is mounted to surround the eighth fuel input holes 81, the eighth fuel output hole 82, the anode flow channel area 83, the cell unit 30 and the anode metal net 50. Similarly, the cathode sealing material 70 of the cell set 90 is mounted to surround the second fuel input holes 21, the second fuel output hole 22, the second flow channel 24, the cell unit 30 and the cathode metal net 60.

As shown, the third cell set 90 of this embodiment is disposed between the two connection plates 80. The anode sealing material 40 of the cell set 90 is mounted to surround the eighth fuel input holes 81, the eighth fuel output hole 82, the anode flow channel area 83, the cell unit 30 and the anode metal net 50. Similarly, the cathode sealing material 70 of the cell set 90 is mounted to surround the eighth fuel input holes 81, the eighth fuel output hole 82, the cathode flow channel area 84, the cell unit 30 and the cathode metal net 60.

Each the anode layer 34 of the cell unit 30 is to face the anode plate 10 at the surface having the first flow channel 14, while each the cathode layer of the cell unit 30 is to face the cathode plate 20 at the surface having the second flow channel 24. The first fuel input holes 11, the second fuel input holes 21, the third fuel input holes 31 and the eighth fuel input holes 81 are aligned, respectively. Also, the first fuel output hole 12, the second fuel output hole 22, the third fuel output hole 32 and the eighth fuel output hole 82 are aligned as well. The second air input holes 25 and the eighth air input holes 85 are aligned in position, while the second air output hole 26 and the eighth air output hole 86 are aligned, respectively.

While in application of this embodiment, the second fuel input holes 21 and second fuel output hole 22 should be disposed with corresponding seal materials (not shown in the figure), and the fuel enters the cell stack module 200 via the first fuel input holes 11, then flows through every anode layer 34 of the corresponding cell unit 30, and finally leaves the cell stack module 200 via the first fuel output hole 12. On the other hand, the air enters the cell stack module 200 via the second air input holes and the eighth air input holes 85, flows through every cathode layer of the corresponding cell unit 30, and finally leaves the cell stack module 200 via the second air output holes 26 and the eighth air output holes 86.

By comparing FIG. 21 and FIG. 22, the piling of three flat plate type solid oxide fuel cell stack units 100 of FIG. 1 can also produce an apparatus resembling functionally to the flat plate type solid oxide fuel cell stack module 200 of FIG. 22. Definitely, the thickness of the apparatus of FIG. 21 would be larger. In FIG. 22, for the connection plate 80 exists to replace the anode plate 10 and the neighboring cathode plate 20 of FIG. 21, such that the thickness of the flat plate type solid oxide fuel cell stack module 200 of FIG. 22 can be substantially reduced.

Further, for the high nickel alloy would relieve Cr under a high temperature to poison the cathode layer 33 of the cell unit 30 and to further degrade the performance, a protective layer shall be coated onto the surfaces of the cathode plate 20 and the cathode flow channel area 84 of the connection plate 80. Such a protective layer can be produced by screen-printing or plasma spraying a mixture of LSM, MnCo and perovskite so as to inhibit the vaporization of the Cr.

Figure 27:
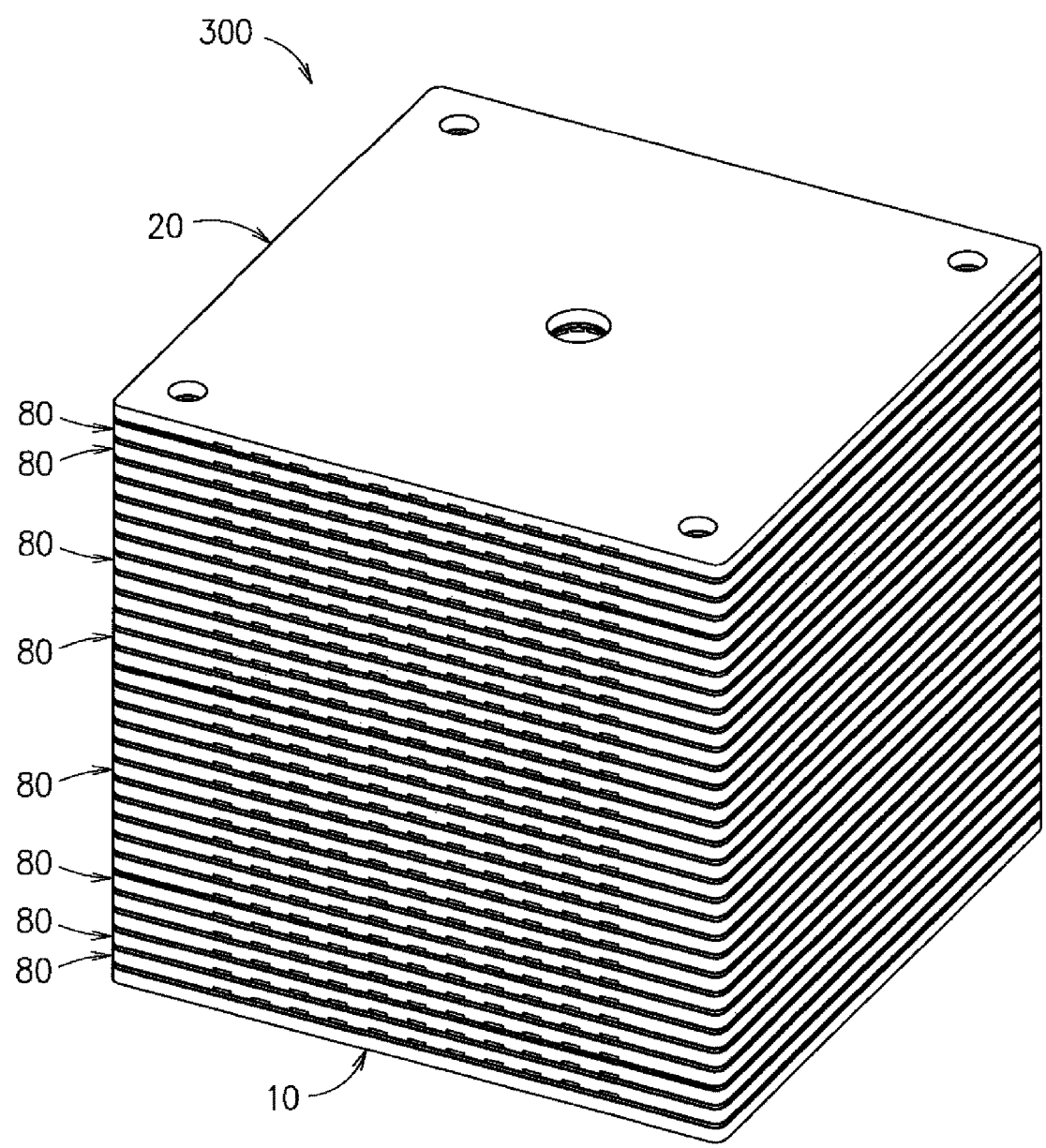
FIG. 27 is a schematic perspective view of another embodiment of the flat plate type solid oxide fuel cell stack module in accordance with the present invention.

Referring now to FIG. 27, a multi-unit cell stack module 300 is shown. Basic structuring for the cell stack module 300 is the same as that for the cell stack module 200 of FIG. 22. The cell stack module 300 includes one anode plate 10 as the bottom, one cathode plate 20 as the top, a plurality of the connection plates 80 and a plurality of the cell sets separated by the connection plates 80. From the descriptions of FIG. 22 and FIG. 27, it is understood that, if the cell units 30 has a number N, then the number for the connection plates 80 would be N−1. Therefore, the embodiment of FIG. 22 is disposed with three cell units 30 and two connection plates 80, and the embodiment of FIG. 27 is disposed with 30 cell units 30 and 29 connection plates 80.

According to prototypes, the thickness of the anode plate 10 may be about 3~5 mm, that of the cathode plate 20 may be about ~5 mm, and that of the connection plate 80 may be about 2~3 mm. Then, for the cell stack module of FIG. 25, the optimal performance contributed by coherent individual stack performance can be obtained at a loading of 20~50 kg and an average stress of about 0.083~0.208 kg/cm$^2$.

In all the aforesaid embodiments, the fuel input holes are all to surround the fuel output hole. The reason for that is based on the consideration of even distribution of the incoming fuel. Alternatively, these two kinds of holes can be switched over in positions. Namely, the fuel output holes can be arranged to surround the fuel input hole.

In summary, the flat plate type solid oxide fuel cell stack unit and the flat plate type solid oxide fuel cell stack module in accordance with the present invention are provided with advantages in a minimized volume, high efficiency, easy packing and assembling and can easily and modularly vary the stack arrangement so as to meet the specification needs of a generation system, Further, for the fuel input and output holes are all planar, so the objects in assembling, moving, loading and packing can be easily achieved. Also, while in application, the number of the cell units for stacking is not limited specifically, even that an optimal performance is demanded.

While the present invention has been particularly shown and described with reference to a preferred embodiment, it will be understood by those skilled in the art that various changes in form and detail may be without departing from the spirit and scope of the present invention.

What is claimed is:

1. A flat plate type solid oxide fuel cell stack module, comprising:
    an anode plate, formed as a rectangle, having a first flow channel structured on a surface thereof, four first fuel input holes located respectively at four corners thereof, and a first fuel output hole located at a center thereof;
    a cathode plate, shaped as a rectangle, having a second flow channel structured on a surface thereof, four second fuel input holes located at respective corners thereof, a second fuel output hole located at a center thereof, a plurality of second air input grooves disposed on a first edge of the cathode plate, and a plurality of second air output grooves disposed on a second edge of the cathode plate opposing to the first edge, wherein the second air input grooves, the second air output grooves and the second flow channel are all communicative in space, the second flow channel shaped differently from the first flow channel;
    a plurality of connection plates, each of the connection plates being shaped as a rectangle and having four eighth fuel input holes located at respective corners thereof, an eighth fuel output hole located at a center thereof, an anode flow channel area, a cathode flow channel area disposed opposing to the side, a plurality of eighth air input grooves disposed adjacent to the cathode flow channel area, and a plurality of eighth air output grooves disposed adjacent to the cathode flow channel area and opposite to the plurality of eighth air input grooves, wherein the eight air input grooves, the eighth air output grooves and the cathode flow channel area are all communicative in space; and
    a plurality of cell sets, each of the cell sets comprising:
        a cell unit, shaped as a rectangle, having four third fuel input holes located at respective corners thereof, a third fuel output hole located at a center thereof, a cathode layer and an anode layer disposed opposite to each other;
        an anode metal net, located between the anode plate and the cell unit;
        a cathode metal net, located between the cathode plate and the cell unit;
        at least one anode sealing material, disposed adjacent to the anode layer; and
        at least one cathode sealing material, disposed adjacent to the cathode layer;
    wherein one of the cell units is disposed between the anode plate and one of the connection plates, the anode sealing material of this cell unit is to surround the corresponding first fuel input holes, the corresponding first fuel output hole, the corresponding first flow channel, this cell unit and the corresponding anode metal net, and the cathode sealing material of this cell unit is to surround the corresponding eighth fuel input holes, the corresponding eighth fuel output hole, the corresponding cathode flow channel area, this cell unit and the corresponding cathode metal net;
    wherein another one of the cell units is disposed between the cathode plate and another one of the connection plates, the anode sealing material of this cell unit is to surround the corresponding eighth fuel input holes, the corresponding eighth fuel output hole, the corresponding anode flow channel area, this cell unit and the corresponding anode metal net, and the cathode sealing material of this cell unit is to surround the corresponding second fuel input holes, the corresponding second fuel output hole, the corresponding second flow channel, this cell unit and the corresponding cathode metal net;
    wherein one of the cell units is disposed between two neighboring said connection plates, the anode sealing material of this cell unit is to surround the corresponding eighth fuel input holes, the corresponding eighth fuel output hole, the corresponding anode flow channel area, this cell unit and the corresponding anode metal net, and the cathode sealing material of this cell unit is to surround the corresponding eighth fuel input holes, the corresponding eighth fuel output hole, the corresponding cathode flow channel area, this cell unit and the corresponding cathode metal net;
    wherein the anode layer of each of the cell units is to face the first flow channel of the corresponding anode plate and the cathode layer of each of the cell units is to face the second flow channel of the corresponding cathode plate; and
    wherein the first fuel input holes, the second fuel input holes, the plurality of third fuel input holes and the plurality of eighth fuel input holes are aligned in respective positions, the first fuel output holes, the second fuel output holes, the third fuel output holes and the eighth fuel output holes are linearly-aligned in respective positions to form a fuel output channel running through the center of the fuel cell stack module, the second air input grooves and the eighth air input grooves are aligned in respective positions, and the second air output grooves and the eighth air output grooves are aligned in respective positions.

2. The flat plate type solid oxide fuel cell stack module of claim 1, wherein the anode flow channel area is disposed with a plurality of anode bumps, the plurality of anode bumps being arranged to encircle the eighth fuel output hole symmetrically along circles with different radiuses to a center point of the eighth fuel output hole, wherein the cathode flow channel area is disposed with a plurality of cathode bumps, the plurality of cathode bumps being arranged to encircle the eighth fuel output hole symmetrically along circles with different radiuses to a center point of the eighth fuel output hole.

3. The flat plate type solid oxide fuel cell stack module of claim 1, wherein the first flow channel is disposed with a plurality of first bumps, the plurality of first bumps being arranged to encircle the first fuel output hole symmetrically along circles with different radiuses to a center point of the first fuel output hole.

4. The flat plate type solid oxide fuel cell stack module of claim 3, wherein the anode flow channel area is structured the same as the first flow channel.

5. The flat plate type solid oxide fuel cell stack module of claim 1, wherein the second flow channel is disposed with a plurality of second bumps, the plurality of second bumps being arranged to encircle the second fuel output hole symmetrically along circles with different radiuses to a center point of the second fuel output hole.

6. The flat plate type solid oxide fuel cell stack module of claim 5, wherein the second bump includes a plurality of parallel longitudinal strips extending in a direction parallel to the second air input grooves.

7. The flat plate type solid oxide fuel cell stack module of claim 6, wherein the cathode flow channel area is structured the same as the second flow channel.

8. The flat plate type solid oxide fuel cell stack module of claim 1, wherein a seal material is disposed inside each of the four second fuel input holes and the second fuel output hole.

* * * * *